United States Patent [19]

Udagawa

[11] Patent Number: 5,439,234
[45] Date of Patent: Aug. 8, 1995

[54] METAL GASKET WITH EDGE SUPPORT BEADS

[75] Inventor: Tsunekazu Udagawa, Ichikawa, Japan

[73] Assignee: Ishikawa Gasket Co., Ltd., Tokyo, Japan

[21] Appl. No.: 127,580

[22] Filed: Sep. 28, 1993

[30] Foreign Application Priority Data

Oct. 1, 1992 [JP] Japan ............... 4-068727 U

[51] Int. Cl.$^6$ .............................. F16J 15/08
[52] U.S. Cl. .............................. 277/235 B
[58] Field of Search ............... 277/233, 235 B

[56] References Cited

U.S. PATENT DOCUMENTS

| 4,434,989 | 3/1984 | Beyer et al. | 277/235 B |
| 4,759,556 | 7/1988 | Udagawa | 277/235 B |
| 4,834,399 | 5/1989 | Udagawa et al. | |
| 4,867,462 | 9/1989 | Udagawa | 277/235 B |
| 5,199,723 | 4/1993 | Udagawa | |

FOREIGN PATENT DOCUMENTS

| 535707 | 1/1957 | Canada | 277/235 B |
| 581615 | 2/1994 | European Pat. Off. | 277/235 B |
| 893598 | 9/1953 | Germany . | |
| 1003523 | 2/1957 | Germany . | |
| 2856186 | 7/1980 | Germany . | |
| 62-261756 | 11/1987 | Japan . | |
| 63-210466 | 9/1988 | Japan . | |
| 268267 | 5/1950 | Switzerland . | |
| 313217 | 5/1956 | Switzerland . | |

Primary Examiner—William A. Cuchlinski, Jr.
Assistant Examiner—Scott W. Cummings
Attorney, Agent, or Firm—Kanesaka & Takeuchi

[57] ABSTRACT

A metal gasket of the invention is used for an internal combustion engine formed of a cylinder head and a cylinder block. The gasket is basically formed of one metal plate, and includes a plurality of cylinder bores arranged in a longitudinal direction of the gasket, and a plurality of bolt holes arranged to surround the cylinder bores. Edge support beads are formed on the plate around the cylinder bores located at the lateral side portions to substantially completely support tightening pressure of the bolts applied to the lateral side portions. Thus, deformation of the cylinder head is prevented, and substantially equal tightening pressure can be formed around the entire cylinder bores.

8 Claims, 1 Drawing Sheet

METAL GASKET WITH EDGE SUPPORT BEADS

BACKGROUND OF THE INVENTION AND RELATED ART STATEMENT

The present invention relates to a metal gasket with edge support beads to prevent upward expansion or deformation of a cylinder head of an engine.

In an engine having a plurality of cylinder bores arranged in one or a longitudinal direction, a plurality of bolt holes are arranged to surround the respective cylinder bores to tightly seal therearound. A gasket to be installed in this engine includes a plurality of sealing means around the cylinder bores, at which high surface pressure is formed when the gasket is tightened.

When the gasket is tightened between a cylinder head and a cylinder block by bolts, sealing means situated around the respective cylinder bores are compressed. In this respect, a bolt located in a middle portion of the engine operates to tighten two, i.e. right and left, longitudinal sides of the sealing means relative to the bolt. However, a bolt at the longitudinal end of the engine operates to tighten only one side of the sealing means, not two sides. Thus, the bolt at the longitudinal end operates to tighten the sealing means at a pressure generally twice as much as that at the middle portion of the sealing means.

The unbalanced tightening pressure causes the middle portion of the cylinder head to project upwardly. As a result, equal sealing pressure is not obtained at the sealing means.

In U.S. Pat. No. 4,834,399, a bead is formed around the entire edge portion of the gasket. However, since the bead completely surrounds the edge portion of the gasket, the bead supports all the surface pressure applied by the bolts. Namely, the bead does not support required portions.

In U.S. Pat. No. 5,199,723, a bead is formed around a water hole of a gasket, and a support bead facing a gasket edge portion is formed outside the bead. The support bead reduces vibration of the gasket at the gasket edge portion when the engine is operated.

In Switzerland Patent No. 268,267, a metal plate includes a various kinds of holes therein, around which a plurality of beads is formed to surround the same.

In the prior art patents, a various kind of beads is formed on the gasket to seal or reduce vibration of the gasket. However, the beads have not been formed around selected areas of the cylinder bores to prevent deformation of the cylinder head.

Accordingly, one object of the invention is to provide a metal gasket, which can provide by tightening bolts substantially equal surface pressure to all sealing means formed around the cylinder bores.

Another object of the invention is to provide a metal gasket as stated above, which can substantially prevent deformation of a cylinder head caused by unbalanced surface pressure on the sealing means.

A further object of the invention is to provide a metal gasket as stated above, which can be easily and economically manufactured.

Further objects and advantages of the invention will be apparent from the following description of the invention.

SUMMARY OF THE INVENTION

A metal gasket of the invention is installed in an internal combustion engine formed of a cylinder head and a cylinder block. The engine includes two longitudinal edges, and two lateral edges substantially perpendicular to the longitudinal edges and parallel to a longitudinal direction of the engine to form a rectangular shape. The engine also includes a plurality of cylinder bores arranged along the longitudinal direction of the engine, and a plurality of bolt holes arranged to surround the cylinder bores. The bolt holes located at the longitudinal ends of the engine are located close to the longitudinal edges of the engine.

The gasket is formed of at least one metal plate extending substantially throughout the entire area of the engine. The metal plate includes a plurality of first holes corresponding to the cylinder bores, a plurality of second holes corresponding to the bolt holes, and a plurality of sealing beads formed around the first holes for sealing therearound.

The gasket further includes two edge support beads located at least partly around the first holes situated only at longitudinal ends of the gasket. The support beads substantially completely support the tightening pressure of bolts installed at the longitudinal ends of the gasket to thereby prevent deformation of the cylinder head and provide substantially equally tightening pressure around the entire cylinder bores.

In the gasket, the metal plate has substantially no space for forming a support member between the edge and the bolt hole adjacent thereto. Thus, the edge support beads are formed around the cylinder bores at the longitudinal ends of the gasket. Since the edge support beads are formed, the longitudinal ends of the gasket are not strongly compressed. Thus, the cylinder head does not project upwardly at the middle portion thereof, so that the beads formed around all the cylinder bores are substantially equally compressed when the gasket is tightened. Accordingly, the gasket can completely seal all around the cylinder bores.

In this respect, if the edge support beads are not formed at the longitudinal ends of the gasket, the longitudinal ends are strongly compressed by the bolts. Thus, the middle portion of the cylinder head is liable to project upwardly. Thus, the sealing means for the cylinder bores can not be compressed equally, and gas leakage may occur.

The edge support bead of the invention may completely surround the first hole, or the edge support bead may extend only half of the first hole at a side of the longitudinal end. In either case, the gasket operates as intended.

In case the gasket is formed of only one metal plate, the sealing beads and the edge support beads are formed on the same plate. However, if the gasket is formed of two or more metal plates, the sealing beads and the edge support beads may be formed on different plates and arranged to face against each other.

DETAILED DESCRIPTION OF THE PREFERRED EMBODIMENT

Figure 1:
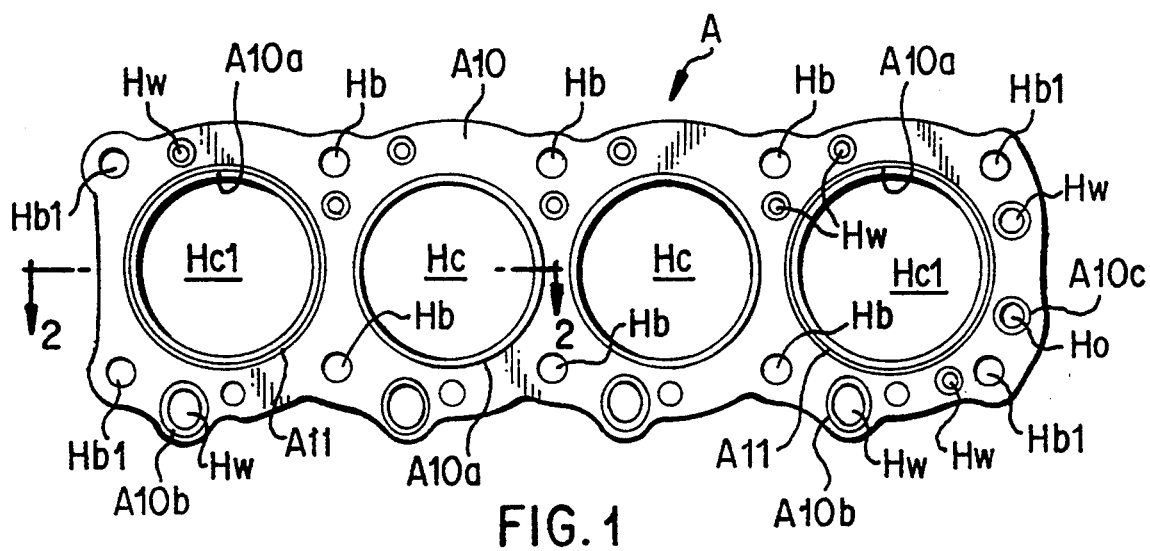
FIG. 1 is an explanatory plan view of a first embodiment of a metal plate for constituting a metal gasket of the invention.
Figure 2:
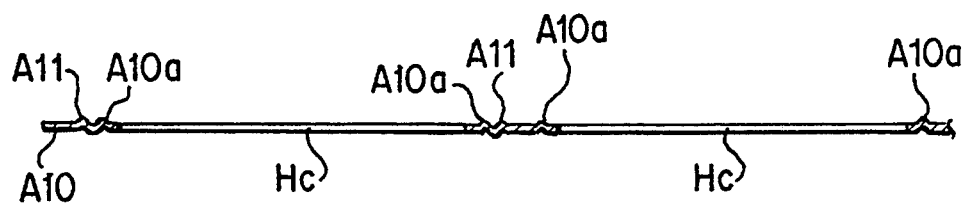
FIG. 2 is an enlarged section view taken along a line 2—2 in FIG. 1.

With reference to FIGS. 1 and 2, a metal gasket A of the invention is shown. The gasket A is a cylinder head gasket and includes cylinder bores Hc, Hc1, water holes Hw, oil hole Ho, bolt holes Hb, Hb1, and so on, as in the conventional gasket.

The cylinder bores Hc1 are located at the longitudinal ends of the gasket, but the cylinder bores Hc are located inside the gasket. The bolt holes Hb1 are located near the longitudinal ends of the gasket, while the bolt holes Hb are located away from the longitudinal ends.

The gasket A is formed of one metal plate A10, and includes sealing beads A10a around the cylinder bores Hc, Hc1. Also, beads A10b, A10c are formed around the water holes Hw and oil hole Ho. These beads seal around the cylinder bores Hc, Hc1, water holes Hw and oil hole Ho, respectively, when the gasket is tightened.

In the gasket A, the cylinder bores Hc, Hc1 are arranged along a longitudinal direction, and the bolt holes Hb, Hb1 are arranged to surround the cylinder bores Hc, Hc1. In this engine, when the gasket A is tightened, each bolt (not shown) inserted in the bolt hole Hb provides surface pressure for sealing two portions of the cylinder bores, while each bolt (not shown) inserted in the bolt hole Hb1 seals only one portion of the cylinder bore.

If the gasket is tightened at the same torque by the bolts, the surface pressure formed around the bolt hole Hb becomes nearly half of the surface pressure formed around the bolt hole Hb1. Namely, the longitudinal ends of the cylinder head gasket are tightened stronger than the middle portion of the gasket.

In the above case, the middle portion of the cylinder head has a space relative to the cylinder block greater than that at the longitudinal ends of the cylinder head. Namely, the middle portion of the cylinder head slightly projects upwardly. Since the cylinder head deforms slightly as stated above, the sealing means for the cylinder bores can not receive equal surface pressure. Thus, gas may leak through the cylinder bores.

In the present invention, in order to provide equal surface pressure even by the bolts in the bolt holes Hb1, the plate A10 is provided with edge support beads A11 around the cylinder bores Hc1. Since the beads A11 are formed in addition to the sealing beads A10a, although high tightening pressure is applied around the cylinder bores Hc1, the beads A11 receive or support the extra tightening pressure. Thus, it is possible to provide substantially equal surface pressure all the beads A10a.

In the gasket A, the metal plate A10 has substantially no space outside the bolt hole Hb1. Thus, a support member or a device for absorbing tightening pressure of a bolt in the bolt hole Hb1 can not be formed or interposed between the longitudinal edge and the bolt hole Hb1, so that the support bead A11 is formed around the cylinder bore Hc1. Since the support beads A11 are formed, the longitudinal ends of the gasket are not strongly compressed. Thus, the cylinder head does not project upwardly at the middle portion thereof, and therefore, the beads formed around all the cylinder bores are substantially equally compressed when the gasket is tightened. Gas leakage does not occur by unbalanced surface pressure of the sealing means.

Figure 3:
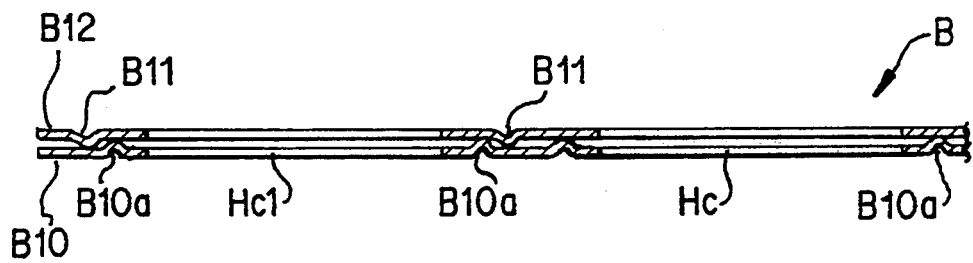
FIGS. 3 and 4 are section views, similar to FIG. 2, for showing second and third embodiments of a metal gasket of the invention.

FIG. 3 shows a second embodiment B of the gasket of the invention. The gasket B is a metal laminate gasket and is formed of an upper plate B12 and a lower plate B10 laminating together. The lower plate B10 includes beads B10a around the cylinder bores Hc, Hc1. The upper plate B12 includes edge support beads B11 only around the cylinder bores Hc1. When the plates B10, B12 are assembled, the bead B11 is located outside the bead B10a of the lower plate B10. In the gasket B, the support beads B11 is formed on the plate B12 separately from the plate B10, but the gasket B operates as in the gasket A.

Figure 4:
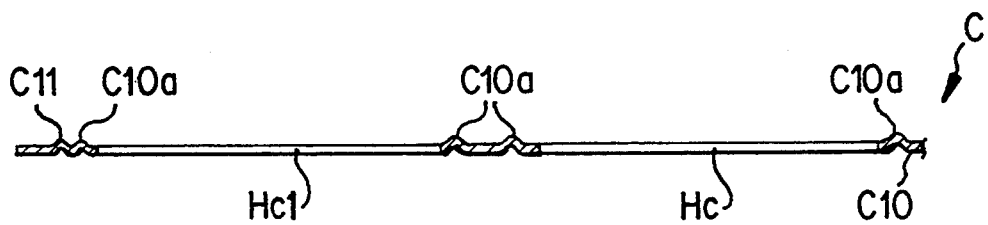

FIG. 4 shows a third embodiment C of the gasket of the invention. The gasket C is formed of one plate C10, and includes beads C10a around the cylinder bores Hc, Hc1, as in the gasket A. The plate C10 also includes edge support beads C11 around the beads C10a. However, the bead C11 does not completely surround the cylinder bore Hc1, and in the gasket C, the bead C11 surrounds the half of the cylinder bore Hc1 at a side of the bolt holes Hb1.

In the gasket C, since the bead C11 is formed only at the side of the bolt holes Hb1, the bead C11 supports only the tightening pressure by the bolts inserted into the bolt holes Hb1. Thus, when the gasket C is tightened, all the beads C10a are substantially equally compressed. Relatively equally surface pressure is formed around all the cylinder bores Hc, Hc1.

In the present invention, the lateral ends of the gasket can be sufficiently supported by the edge support beads. Thus, deformation of the cylinder head is prevented, and the sealing means around the cylinder bores are equally compressed to securely seal therearound.

While the invention has been explained with reference to the specific embodiments of the invention, the explanation is illustrative, and the invention is limited only by the appended claims.

What is claimed is:

1. A metal gasket for an internal combustion engine formed of a cylinder head and a cylinder block, said engine including two longitudinal edges, two lateral edges substantially perpendicular to the longitudinal edges and parallel to a longitudinal direction of the engine to form a generally rectangular shape, a plurality of cylinder bores arranged along the longitudinal direction of the engine, and a plurality of bolt holes arranged to surround the cylinder bores, some of said bolt holes located at longitudinal ends of the engine being located close to the longitudinal edges, said gasket comprising, at least one metal plate extending substantially throughout an entire area of the engine for constituting the metal gasket, said metal plate including two longitudinal ends, two lateral ends perpendicular to the longitudinal ends and parallel to a longitudinal direction of the gasket, a plurality of first holes corresponding to the cylinder bores, a plurality of second holes corresponding to the bolt holes, and a plurality of sealing beads formed around the first holes for sealing therearound, and two edge support beads integrally formed on the plate and located only around the first holes situated at longitudinal ends of the gasket to substantially completely support tightening pressure of bolts applied to the longitudinal ends of the gasket to thereby prevent deformation of the cylinder head and provide substantially equal tightening pressure around the entire cylinder bores.

2. A metal gasket according to claim 1, wherein said metal plate has substantially no space for forming a support member between the longitudinal edge and the bolt hole adjacent thereto.

3. A metal gasket according to claim 2, wherein said each edge support bead completely surrounds the first hole.

4. A metal gasket according to claim 2, wherein said each edge support bead extends around only half of the first hole at a side of the longitudinal edge.

5. A metal laminate gasket for an internal combustion engine formed of a cylinder head and a cylinder block, said engine including two longitudinal edges, two lateral edges substantially perpendicular to the longitudinal edges and parallel to a longitudinal direction of the engine to form a generally rectangular shape, a plurality of cylinder bores arranged along the longitudinal direction of the engine, and a plurality of bolt holes arranged to surround the cylinder bores, some of said bolt holes located at longitudinal ends of the engine being located close to the longitudinal edges, said gasket comprising, first and second metal plates extending substantially throughout an entire area of the engine for constituting the metal laminate gasket, said first and second plates including two longitudinal ends, two lateral ends perpendicular to the longitudinal ends and parallel to a longitudinal direction of the gasket, a plurality of first holes corresponding to the cylinder bores, and a plurality of second holes corresponding to the bolt holes, a sealing bead integrally formed on the first plate around each first hole for sealing therearound, and two edge support beads integrally formed on the second plate and located only around the first holes situated at longitudinal ends of the gasket when the first and second plates are assembled, said edge support beads substantially completely supporting tightening pressure of bolts applied to the longitudinal ends of the gasket to thereby prevent deformation of the cylinder head and provide substantially equally tightening pressure around the entire cylinder bores.

6. A metal laminate gasket according to claim 5, wherein said first and second metal plates have substantially no space for forming a support member between the longitudinal edge and the bolt hole adjacent thereto.

7. A metal laminate gasket according to claim 6, wherein said each edge support bead completely surrounds the first hole.

8. A metal laminate gasket according to claim 6, wherein said each edge support bead extends around only half of the first hole at a side of the longitudinal edge.

* * * * *

UNITED STATES PATENT AND TRADEMARK OFFICE
CERTIFICATE OF CORRECTION

PATENT NO. : 5,439,234
DATED : August 8, 1995
INVENTOR(S) : Tsunekazu Udagawa

It is certified that error appears in the above-indentified patent and that said Letters Patent is hereby corrected as shown below:

```
Column 1, line 44, delete "a";
         line 46, change "a various kind of beads is" to
                  --various kinds of beads are--; and
Column 3, line 52, before "all" add --to--.
```

Signed and Sealed this

Seventeenth Day of October, 1995

BRUCE LEHMAN

*Attest:*

*Attesting Officer*     *Commissioner of Patents and Trademarks*